(12) United States Patent
Tang

(10) Patent No.: US 9,846,270 B2
(45) Date of Patent: Dec. 19, 2017

(54) QUANTUM DOT TUBE AND LCD

(71) Applicant: Shenzhen China Star Optoelectronics Technology Co., Ltd., Shenzhen (CN)

(72) Inventor: Min Tang, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 151 days.

(21) Appl. No.: 14/912,926

(22) PCT Filed: Jan. 29, 2016

(86) PCT No.: PCT/CN2016/072651
§ 371 (c)(1),
(2) Date: Feb. 19, 2016

(87) PCT Pub. No.: WO2017/101201
PCT Pub. Date: Jun. 22, 2017

(65) Prior Publication Data
US 2017/0168216 A1    Jun. 15, 2017

(30) Foreign Application Priority Data
Dec. 14, 2015  (CN) .......................... 2015 1 0926733

(51) Int. Cl.
*G02F 1/1335*    (2006.01)
*F21V 8/00*    (2006.01)

(52) U.S. Cl.
CPC ......... *G02B 6/0026* (2013.01); *G02B 6/0028* (2013.01); *G02B 6/0051* (2013.01);
(Continued)

(58) Field of Classification Search
CPC ............. G02F 1/1336; G02F 1/133617; G02F 1/133615; G02B 6/0026; G02B 6/0028;
(Continued)

(56) References Cited

U.S. PATENT DOCUMENTS

| 2013/0114299 A1* | 5/2013 | Lee ...................... G02B 6/0011 362/612 |
| 2014/0133129 A1* | 5/2014 | Roh ........................ B82Y 20/00 362/84 |
| 2015/0234111 A1* | 8/2015 | Lee ...................... G02B 6/0023 362/608 |

FOREIGN PATENT DOCUMENTS

CN    105114867 A    12/2015

* cited by examiner

Primary Examiner — Jessica M Merlin
(74) Attorney, Agent, or Firm — Leong C. Lei

(57) ABSTRACT

The invention discloses a quantum dot tube and LCD. The quantum dot tube comprises an inner tube (11), an outer tube (12), optical fibers (13), LED light source (14), sealing glue (15) and quantum dots (16); the LED light source (14) is blue LED light source; the cladding is removed from the optical fiber (13). The quantum dot tube reduces the heat impact of the LED light source on the quantum dots so as to improve the lifespan and the efficiency of the quantum dots; and by sealing inner and outer tubes, the amount of quantum dots is reduced to reduce the cost. The LCD of the invention comprises a backlight module and a liquid crystal panel, the backlight module use the quantum dot tube to provide light, to improve the lifespan and efficiency of the quantum dots as well as reduce cost and improve the LCD gamut.

11 Claims, 3 Drawing Sheets

(52) U.S. Cl.
CPC ......... *G02B 6/0055* (2013.01); *G02B 6/0068*
(2013.01); *G02B 6/0073* (2013.01); *G02F*
*1/1336* (2013.01); *G02F 1/133615* (2013.01);
*G02F 1/133617* (2013.01)

(58) Field of Classification Search
CPC .. G02B 6/0051; G02B 6/0066; G02B 6/0068;
G02B 6/0073; G02B 27/0994
See application file for complete search history.

QUANTUM DOT TUBE AND LCD

BACKGROUND OF THE INVENTION

1. Field of the Invention

The present invention relates to the field of display, and in particular to a quantum dot tube and liquid crystal display (LCD).

2. The Related Arts

Quantum dot (QD), also referred to as nano-crystal, is a nano-particle made of II-VI or III-V group elements. The particle size of a quantum dot is generally between 1-20 nm. Because electrons and holes are quantum confined, the continuous energy band structure becomes discrete energy level structure with molecular properties. Thus, after the blue-violet light excitement, the quantum dot can convert into a light of high-purity monochromatic color, whose color can be controlled by the diameter of the quantum dot. When applied in the panel display technology, the quantum dot can effectively improve the color gamut panel, i.e., color reproduction capability.

At present, quantum dots have been widely used in thin film transistor liquid crystal display (TFT-LCD), for example, adding quantum dot tube or a quantum dot enhanced film to the LCD backlight module. Moreover, quantum dot polarizers, quantum dot color barrier, and quantum dot light emitting diode (LED) technologies are also under development.

Refer to FIG. 1. The backlight module of the quantum dot tube used in large-size LCD TV is a known technique, wherein the LED light source 200 is a blue LED strip light, blue light emitted by the LED light source 200 excites the red and green quantum dots 101, 102 in the quantum dot tube 100 to emit red and green light, respectively. The red and green light with the unexcited blue light are mixed to form a white light. The white light passes through the light-guiding plate 300, a prism sheet, and a diffusion sheet to form backlighting. Compared to conventional white LED backlight, the backlight can significantly enhance the color gamut of the LCD displays, such as, raising the original 72% NTSC up to 100% NTSC. The disadvantage is that the tube 100 is close to the LED light source 200, and the heat from the quantum dot LED light source 200 will shorten the lifespan of the quantum dots.

Hence, it is desirable to provide a quantum dot tube and LCD to address the above issue.

SUMMARY OF THE INVENTION

The object of the present invention is to provide a quantum dot tube, in which the quantum dot has a long lifespan, high efficiency and low production cost.

Another object of the present invention is to provide an LCD, which uses the quantum dot tube as a light source, in which the quantum dot has a long lifespan, high efficiency and low production cost.

To achieve the above objects, the present invention provides an quantum dot tube, which comprises: an inner tube, an outer tube sheathed over the inner tube, a plurality of optical fibers passing through the inner tube, an LED light source connecting to the ends of the optical fibers, sealing glue for sealing the inner tube and the outer tube at both ends, and quantum dots sealed between the inner tube and the outer tube; the quantum dots comprising: red quantum dots and green quantum dots; the LED light source being blue LED light source; the optical fiber having the fiber cladding removed to make the blue light from the LED light source emitting through the optical fiber and passing the wall of inner tube to excite the red quantum dots and green quantum dots to emit red light and green light; the red light, green light and the unabsorbed blue light mixed into a white light, which emitting through the outer tube wall to form a white light source.

The inner tube and the outer tube are both transparent tubes.

The inner tube and the outer tube are disposed co-axially.

The cladding of the optical fibers is removed by a laser process.

The optical fibers are coupled to the LED light source through a coupler.

The present invention also provides an LCD, which comprises: a backlight module, and a liquid crystal panel disposed on the backlight module; the backlight module comprising a reflection plate, a light-guiding plate disposed above the reflection plate, a quantum dot tube disposed on a side of the light-guiding plate, a diffuser disposed above the light-guiding plate and a brightness enhancement film (BEF) disposed above the diffuser; the quantum dot tube comprising: an inner tube, an outer tube sheathed over the inner tube, a plurality of optical fibers passing through the inner tube, an LED light source connecting to the ends of the optical fibers, sealing glue for sealing the inner tube and the outer tube at both ends, and quantum dots sealed between the inner tube and the outer tube; the quantum dots comprising: red quantum dots and green quantum dots; the LED light source is blue LED light source; the optical fiber having the fiber cladding removed to make the blue light from the LED light source emitting through the optical fiber and passing the wall of inner tube to excite the red quantum dots and green quantum dots to emit red light and green light; the red light, green light and the unabsorbed blue light mixed into a white light, which emitting through the outer tube wall to form a white light source.

The inner tube and the outer tube are both transparent tubes.

The inner tube and the outer tube are disposed co-axially.

The cladding of the optical fibers is removed by a laser process.

The optical fibers are coupled to the LED light source through a coupler.

The present invention also provides an quantum dot tube, which comprises: an inner tube, an outer tube sheathed over the inner tube, a plurality of optical fibers passing through the inner tube, an LED light source connecting to the ends of the optical fibers, sealing glue for sealing the inner tube and the outer tube at both ends, and quantum dots sealed between the inner tube and the outer tube; the quantum dots comprising: red quantum dots and green quantum dots; the LED light source being blue LED light source; the optical fiber having the fiber cladding removed to make the blue light from the LED light source emitting through the optical fiber and passing the wall of inner tube to excite the red quantum dots and green quantum dots to emit red light and green light; the red light, green light and the unabsorbed blue light mixed into a white light, which emitting through the outer tube wall to form a white light source; wherein the inner tube and the outer tube are both transparent tubes; wherein the inner tube and the outer tube are disposed co-axially; wherein the cladding of the optical fibers is removed by a laser process; wherein the optical fibers are coupled to the LED light source through a coupler.

Compared to the known techniques, the present invention provides the following advantages: the quantum dot tube of the invention comprises an inner tube, an outer tube sheathed over the inner tube, a plurality of optical fibers passing through the inner tube, and red and green quantum dots sealed between the inner tube and the outer tube; by sealing the inner tube and the outer tube at both ends, the optical fibers are fixed; the two ends of the optical fibers are coupled to a blue LED light source; the cladding is removed from the optical fiber to make the blue light from the LED light source emitting through the optical fiber and passing the wall of inner tube to excite the red quantum dots and green quantum dots to emit red light and green light; the red light, green light and the unabsorbed blue light are mixed into a white light emitting through the outer tube wall to form a white light source; the distance between the LED light source and the quantum dots is increased by disposing the optical fibers to reduce the heat impact of the LED light source on the quantum dots so as to improve the lifespan and the efficiency of the quantum dots; by sealing the inner tube and the outer tube, the amount of quantum dots used is reduced to reduce the production cost of the quantum dot tube. The LCD of the invention comprises a backlight module and a liquid crystal panel, the backlight module may use the above quantum dot tube to provide a light source, to improve the lifespan and the efficiency of the quantum dots as well as reduce production cost and greatly improve the gamut of the LCD.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
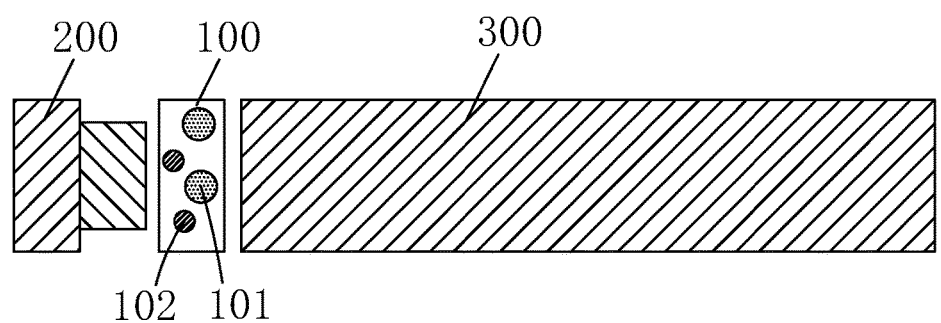
FIG. 1 is a schematic view showing the known quantum dot tube applied to the backlight module.
Figure 2:
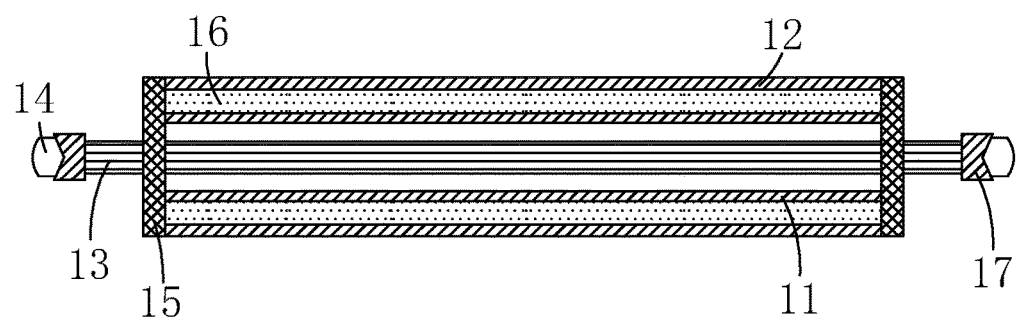
FIG. 2 is a cross-sectional view showing the quantum dot tube provided by an embodiment of the present invention.
Figure 3:
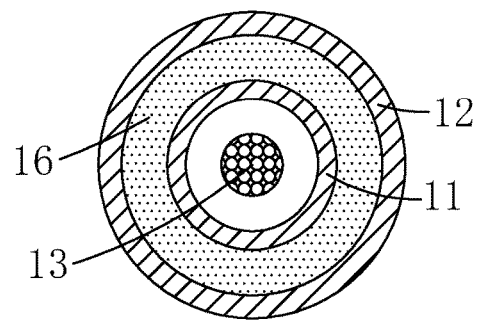
FIG. 3 is another cross-sectional view showing the quantum dot tube provided by an embodiment of the present invention.
Figure 4:
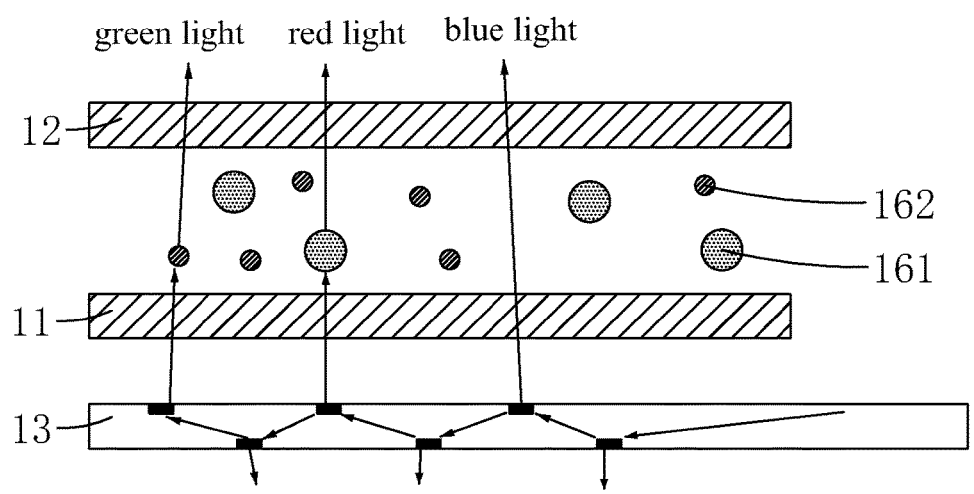
FIG. 4 is a schematic view showing the optical path of the quantum dot tube provided by an embodiment of the present invention.

Refer to FIGS. 2-4. The present invention provides an quantum dot tube, which comprises: an inner tube 11, an outer tube 12 sheathed over the inner tube 11, a plurality of optical fibers 13 passing through the inner tube 11, an LED light source 14 connecting to the ends of the optical fibers 13, sealing glue 15 for sealing the inner tube 11 and the outer tube 12 at both ends, and quantum dots 16 sealed between the inner tube 11 and the outer tube 12. The sealing glue 15 also fixes the optical fibers 13 in addition to sealing the quantum dots 16.

The quantum dots 16 comprise red quantum dots 161 and green quantum dots 162. The LED light source 14 is blue LED light source. The optical fibers 13 have the fiber cladding removed to make the blue light from the LED light source 14 emitting through the optical fibers 13 and passing the wall of inner tube 11 to excite the red quantum dots 161 and green quantum dots 162 to emit red light and green light. The red light, green light and the unabsorbed blue light are mixed into a white light, which emitting through the outer tube 12 wall to form a white light source.

Specifically, the inner tube 11 and the outer tube 12 are both transparent tubes. Preferably, the inner tube 11 and the outer tube 12 both have a round cross-section.

Specifically, the inner tube 11 and the outer tube 12 are disposed co-axially.

The cladding of the optical fibers 13 is removed by a laser process or other processes to eliminate total-reflection so that the light can emit from the optical fibers 13.

Specifically, the optical fibers 13 are coupled to the LED light source 14 through a coupler 17.

The quantum dot tube of the present invention can share a mold with the existing cold cathode fluorescent lamp (CCFL) and can replace the CCFL directly for application to the edge backlight module.

The above quantum dot tube comprises an inner tube, an outer tube sheathed over the inner tube, a plurality of optical fibers passing through the inner tube, and red and green quantum dots sealed between the inner tube and the outer tube; by sealing the inner tube and the outer tube at both ends, the optical fibers are fixed; the two ends of the optical fibers are coupled to a blue LED light source; the cladding is removed from the optical fiber to make the blue light from the LED light source emitting through the optical fiber and passing the wall of inner tube to excite the red quantum dots and green quantum dots to emit red light and green light; the red light, green light and the unabsorbed blue light are mixed into a white light emitting through the outer tube wall to form a white light source; the distance between the LED light source and the quantum dots is increased by disposing the optical fibers to reduce the heat impact of the LED light source on the quantum dots so as to improve the lifespan and the efficiency of the quantum dots; by sealing the inner tube and the outer tube, the amount of quantum dots used is reduced to reduce the production cost of the quantum dot tube.

Figure 5:
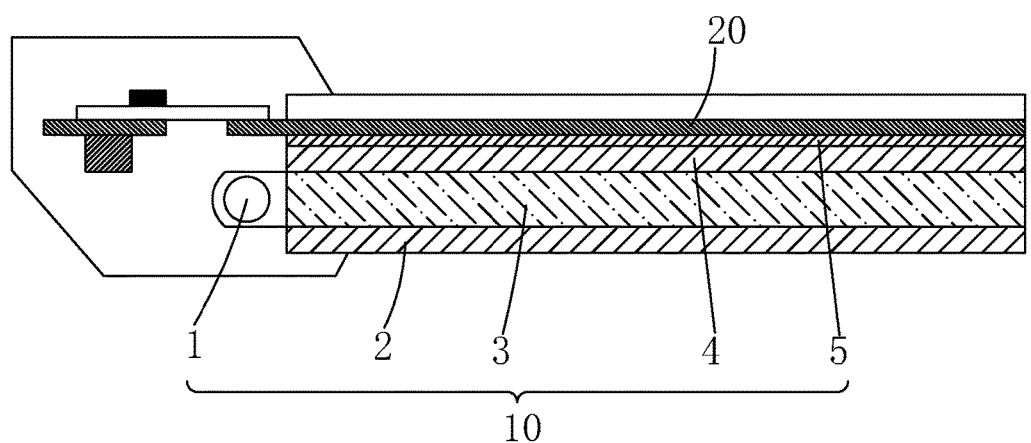
FIG. 5 is a cross-sectional view showing the LCD provided by an embodiment of the present invention.

Refer to FIG. 5, in combination with FIGS. 1-4. The present invention also provides an LCD, which comprises: a backlight module 10, and a liquid crystal panel 20 disposed on the backlight module 10, The backlight module 10 comprises a reflection plate 2, a light-guiding plate 3 disposed above the reflection plate 2, a quantum dot tube 1 disposed on a side of the light-guiding plate 3, a diffuser 4 disposed above the light-guiding plate 3 and a brightness enhancement film (BEF) 5 disposed above the diffuser 4.

The quantum dot tube comprises: an inner tube 11, an outer tube 12 sheathed over the inner tube 11, a plurality of optical fibers 13 passing through the inner tube 11, an LED light source 14 connecting to the ends of the optical fibers 13, sealing glue 15 for sealing the inner tube 11 and the outer tube 12 at both ends, and quantum dots 16 sealed between the inner tube 11 and the outer tube 12. The sealing glue 15 also fixes the optical fibers 13 in addition to sealing the quantum dots 16.

The quantum dots 16 comprise red quantum dots 161 and green quantum dots 162. The LED light source 14 is blue LED light source. The optical fibers 13 have the fiber cladding removed to make the blue light from the LED light source 14 emitting through the optical fibers 13 and passing the wall of inner tube 11 to excite the red quantum dots 161 and green quantum dots 162 to emit red light and green light. The red light, green light and the unabsorbed blue light are mixed into a white light, which emitting through the outer tube 12 wall to form a white light source.

Specifically, the inner tube 11 and the outer tube 12 are both transparent tubes. Preferably, the inner tube 11 and the outer tube 12 both have a round cross-section.

Specifically, the inner tube 11 and the outer tube 12 are disposed co-axially.

The cladding of the optical fibers 13 is removed by a laser process or other processes to eliminate total-reflection so that the light can emit from the optical fibers 13.

Specifically, the optical fibers 13 are coupled to the LED light source 14 through a coupler 17.

The LCD of the invention comprises a backlight module and a liquid crystal panel, the backlight module may use the above quantum dot tube to provide a light source, to improve the lifespan and the efficiency of the quantum dots as well as reduce production cost and greatly improve the gamut of the LCD.

In summary, the quantum dot tube of the invention comprises an inner tube, an outer tube sheathed over the inner tube, a plurality of optical fibers passing through the inner tube, and red and green quantum dots sealed between the inner tube and the outer tube; by sealing the inner tube and the outer tube at both ends, the optical fibers are fixed; the two ends of the optical fibers are coupled to a blue LED light source; the cladding is removed from the optical fiber to make the blue light from the LED light source emitting through the optical fiber and passing the wall of inner tube to excite the red quantum dots and green quantum dots to emit red light and green light; the red light, green light and the unabsorbed blue light are mixed into a white light emitting through the outer tube wall to form a white light source; the distance between the LED light source and the quantum dots is increased by disposing the optical fibers to reduce the heat impact of the LED light source on the quantum dots so as to improve the lifespan and the efficiency of the quantum dots; by sealing the inner tube and the outer tube, the amount of quantum dots used is reduced to reduce the production cost of the quantum dot tube. The LCD of the invention comprises a backlight module and a liquid crystal panel, the backlight module may use the above quantum dot tube to provide a light source, to improve the lifespan and the efficiency of the quantum dots as well as reduce production cost and greatly improve the gamut of the LCD.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A quantum dot tube, which comprises:
   an inner tube, an outer tube sheathed over the inner tube, a plurality of optical fibers passing through the inner tube, a light-emitting diode (LED) light source connecting to the ends of the optical fibers, sealing glue for sealing the inner tube and the outer tube at both ends, and quantum dots sealed between the inner tube and the outer tube;
   the quantum dots comprising: red quantum dots and green quantum dots; the LED light source being blue LED light source; the optical fiber having the fiber cladding removed to make the blue light from the LED light source emitting through the optical fiber and passing the wall of inner tube to excite the red quantum dots and green quantum dots to emit red light and green light; the red light, green light and the unabsorbed blue light mixed into a white light, which emitting through the outer tube wall to form a white light source.

2. The quantum dot tube as claimed in claim 1, wherein the inner tube and the outer tube are both transparent tubes.

3. The quantum dot tube as claimed in claim 1, wherein the inner tube and the outer tube are disposed co-axially.

4. The quantum dot tube as claimed in claim 1, wherein the cladding of the optical fibers is removed by a laser process.

5. The quantum dot tube as claimed in claim 1, wherein the optical fibers are coupled to the LED light source through a coupler.

6. A liquid crystal display (LCD), which comprises: a backlight module, and a liquid crystal panel disposed on the backlight module; the backlight module comprising a reflection plate, a light-guiding plate disposed above the reflection plate, a quantum dot tube disposed on a side of the light-guiding plate, a diffuser disposed above the light-guiding plate and a brightness enhancement film (BEF) disposed above the diffuser;
   the quantum dot tube comprising: an inner tube, an outer tube sheathed over the inner tube, a plurality of optical fibers passing through the inner tube, an LED light source connecting to the ends of the optical fibers, sealing glue for sealing the inner tube and the outer tube at both ends, and quantum dots sealed between the inner tube and the outer tube; the quantum dots comprising: red quantum dots and green quantum dots; the LED light source is blue LED light source; the optical fiber having the fiber cladding removed to make the blue light from the LED light source emitting through the optical fiber and passing the wall of inner tube to excite the red quantum dots and green quantum dots to emit red light and green light; the red light, green light and the unabsorbed blue light mixed into a white light, which emitting through the outer tube wall to form a white light source.

7. The LCD as claimed in claim 6, wherein the inner tube and the outer tube are both transparent tubes.

8. The LCD as claimed in claim 6, wherein the inner tube and the outer tube are disposed co-axially.

9. The LCD as claimed in claim 6, wherein the cladding of the optical fibers is removed by a laser process.

10. The LCD as claimed in claim 6, wherein the optical fibers are coupled to the LED light source through a coupler.

11. A quantum dot tube, which comprises:
    an inner tube, an outer tube sheathed over the inner tube, a plurality of optical fibers passing through the inner tube, a light-emitting diode (LED) light source connecting to the ends of the optical fibers, sealing glue for sealing the inner tube and the outer tube at both ends, and quantum dots sealed between the inner tube and the outer tube;

the quantum dots comprising: red quantum dots and green quantum dots; the LED light source being blue LED light source; the optical fiber having the fiber cladding removed to make the blue light from the LED light source emitting through the optical fiber and passing the wall of inner tube to excite the red quantum dots and green quantum dots to emit red light and green light; the red light, green light and the unabsorbed blue light mixed into a white light, which emitting through the outer tube wall to form a white light source;

wherein the inner tube and the outer tube are both transparent tubes;

wherein the inner tube and the outer tube are disposed co-axially;

wherein the cladding of the optical fibers is removed by a laser process;

wherein the optical fibers are coupled to the LED light source through a coupler.

* * * * *